United States Patent

Warren

[15] 3,700,152

[45] Oct. 24, 1972

[54] WEB TRANSPORT APPARATUS

[72] Inventor: Henry Ray Warren, Indianapolis, Ind.

[73] Assignee: RCA Corporation

[22] Filed: Feb. 9, 1971

[21] Appl. No.: 113,974

[52] U.S. Cl. ..................226/108, 226/154, 226/174, 226/181

[51] Int. Cl. ..........................................B65h 17/20

[58] Field of Search......................226/108, 115–117, 226/154, 155, 174, 181

[56] References Cited

UNITED STATES PATENTS 3,219,246 11/1965 Kihara ..................226/195 X 3,580,446 5/1971 Wada ........................226/195

*Primary Examiner*—Richard A. Schacher
*Attorney*—Edward J. Norton

[57] ABSTRACT

In a recorder-reproducer system in which a recording web is transported to and away from a transducing head scanner, an arrangement for advancing the web to the scanner is disabled for a given interval during which a further web moving arrangement disposed beyond the scanner, is active to draw the web away from the scanner.

9 Claims, 5 Drawing Figures

INVENTOR.

Henry Ray Warren

BY

James B. Hayes

ATTORNEY

INVENTOR.
Henry Ray Warren
BY James B. Hayes
ATTORNEY

PATENTED OCT 24 1972 3,700,152

INVENTOR.
Henry Ray Warren
BY James B. Hayes
ATTORNEY

WEB TRANSPORT APPARATUS

This invention relates generally to apparatus for transporting an elongated recording web along a path in cooperative relation with signal transducing means. More particularly, it concerns a technique for eliminating slack in at least a portion of the web which is in cooperative relation with the signal transducing means.

In any type recorder-reproducer system whether it be of the longitudinal, transverse or helical type, it is important that the recording web be transported in a controlled manner without slack past a signal transducing means. This is particularly important in a helical type system, wherein the web is wound in a helical manner about a mandrel with a scanning transducing head traversing long diagonal information tracks across the record medium. In such a system one or more driving means such as a capstan is used to transport the web to, about and away from the scanning transducer. Any slack which is permitted to exist in the recording web, particularly in the area traversed by the scanning transducer, causes disturbance and disruption of the tracking of the web by the scanning transducer. This problem is reduced with the arrangement of the invention, whereby slack in the recording web is removed in at least the portion of the web which cooperates with the signal transducer means.

Briefly in accordance with the invention, which may be utilized in any apparatus for transporting an elongated flexible record medium, which is disposed along a path including transducing means in cooperative relation with the recording medium in a given portion of the path, an arrangement is provided for removing slack in the medium transported along the path. This arrangement includes web advancing means, when enabled, for coacting with a section of the medium beyond the given path portion, to thereby draw the medium through the given portion of the path which includes the transducing means. Further web advancing means are mounted in advance of the given portion of the path, for cooperating with a further portion of the medium. These further means, when enabled, are effective to feed the medium to the given portion of the path where the transducing means is located. And means are provided for delaying the enabling of the first web advancing means with respect to the enabling of the second web advancing means, for a predetermined interval during which the medium is drawn by the first web advancing means, through the given path portion and hence past the transducing means.

Figure 1:
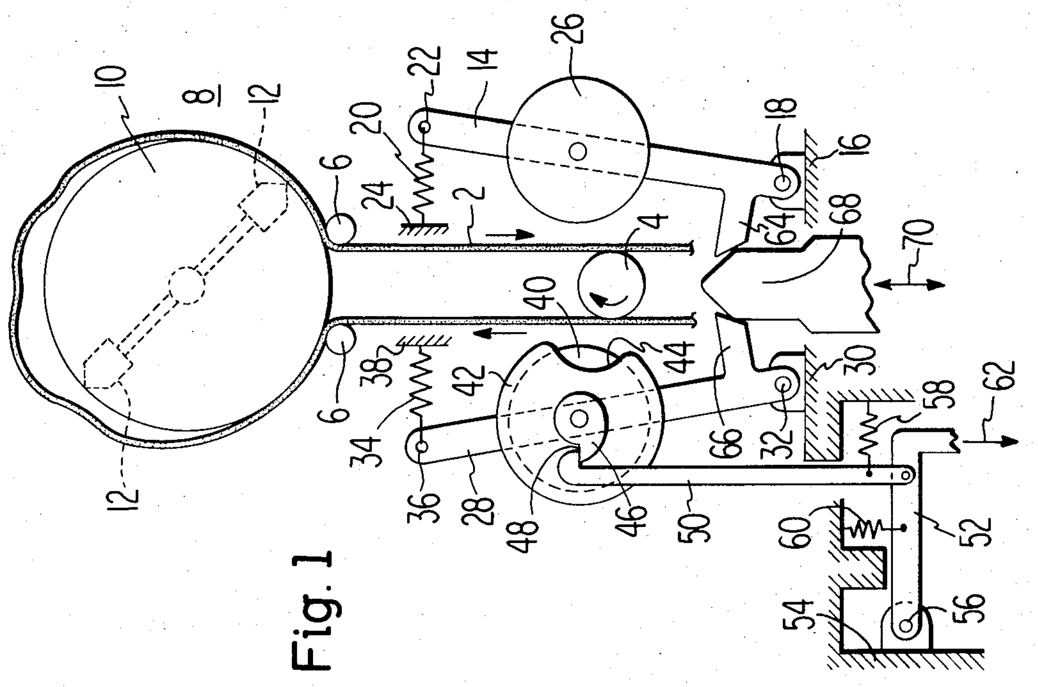

While embodiments of the invention are shown and will be described in conjunction with a helical type recorder-reproducer system, it will be understood as previously indicated that the invention is applicable to all types of recorder reproducer systems. In FIG. 1 an elongated flexible record medium, such as a magnetic tape or web 2, is disposed along a path defined by a series of transport elements. The medium 2 may be provided from and rewound on any suitable supply and takeup reels which, for purposes of clarity, are not shown in the drawing. The path for the medium 2 extends past one side of a driven capstan 4 or other suitable means for imparting motion to the medium 2. The medium 2 is guided by rollers 6 to, about and away from a conventional helical type transducer head scanner 8. The scanner 8 for example may comprise a stationary drum or mandrel 10 having an annular slit, through which one or more rotating transducer heads 12 coact with the record medium 2 wound about the mandrel in a helical fashion. A portion of the medium 2, which exits from the scanner 8 about one of the rollers 6, is disposed past a further side of the capstan or web driving means 4. The medium 2 is thus arranged in a loop about the scanner 8 with entry and exit portions of the medium disposed at respective sides of the capstan 4.

Outside the loop adjacent the exiting portion of the medium 2 there is provided a generally "L" shaped arm 14. The arm 14 is pivotally mounted at one end, to a portion of a fixed frame member 16, by suitable means such as the pinning members 18. The position of the arm 14 is biased toward the medium 2 by means such as spring 20, which is coupled between a point 22 on the arm 14 and a fixed frame member 24. Rotatably mounted on the arm 14 is a cylindrical member 26, which is preferably fabricated from a resilient material such as rubber. The member 26 is commonly known as a pinch roller. The pinch roller 26 is arranged on the arm 14 to cause the medium 2 to be urged into motion imparting relation with the capstan 4, when the arm 14 is pivoted toward the medium 2. Outside the loop adjacent the entrance portion of the medium 2, there is provided a further generally "L" shaped arm 28. The arm 28 is pivotally mounted at one end to a portion of a fixed frame member 30, by suitable means such as the pinning member 32. The position of the arm 28 is biased toward the medium 2 by means such as a spring 34, coupled between a point 36 on the arm 28 and a portion of the fixed frame member 38. A resilient cylindrical member or pinch roller 40 is rotatably mounted on the arm 28, opposite the portion of the medium 2 which is disposed adjacent to capstan 4. A cam means such as a flat cylindrical disc 42 is rotatably mounted to the arm 28. The disc 42 is preferably mounted coaxial with the pinch roller 40, however the disc 42 is arranged to rotate independent of the pinch roller 40. The radius or point of furthest extent of the peripheral surface of the member 42 from its axis of rotation is made greater than the radius of the pinch roller, but less than the radius of the pinch roller plus the distance separating the pinch roller and the capstan when the arm 28 is in the position shown in FIG. 1. The peripheral surface of the member 42 contains a cutout or depressed portion 44 that is slightly larger than the interference between the member 42 and the capstan 4, when the arm 28 is positioned such that the pinch roller is disposed in full engagement with the capstan 4 for imparting motion into the medium 2. As shown more clearly in FIG. 4, the capstan 4 and roller 40 are aligned so that the medium 2 passes therebetween. The disc member 42 is positioned and the capstan 4 is dimensioned so that, as will be explained, while the member 42 contacts the capstan 4 over a portion of its periphery the disc 42 at no time contacts the medium 2.

Mounted on the arm 28 for rotation with the member 42 is a ratchet type member 46. The member 46 has a surface 48 which is disposed opposite the depression 44 of the member 42. The surface 48 is adapted to coact with a member 50 such as a pawl for imparting a given amount of rotation to the member 42. The member 50 is pivotally mounted at one end to an arm 52. The arm 52 is itself pivotally mounted to a fixed frame portion 54 by suitable means such as a pinning member 56. The member 50 is disposed in cooperative relation with the member 46 by restrained biasing means, which for example as shown, include springs 58 and 60 and portions of the fixed frame members 30 and 54. A force exerted by means not shown on the arm 52 in the direction of arrow 62, causes member 50 to be coactively engaged with the surface 48 on member 46 when the member 42 is positioned as shown in FIG. 1.

Each of the arms 14 and 28 have generally transverse projections 64 and 66 which extend toward the capstan 4. The ends of the respective projections 64 and 66 are shaped for engagement by suitable means such as tapered plunger 68, which may be interposed between the ends of the portions 64 and 66. The means 68 is arranged to be controllably moveable in the directions indicated by the arrow 70, by suitable means such as a solenoid which is not shown, for pivoting the arms 14 and 28.

Figure 2:
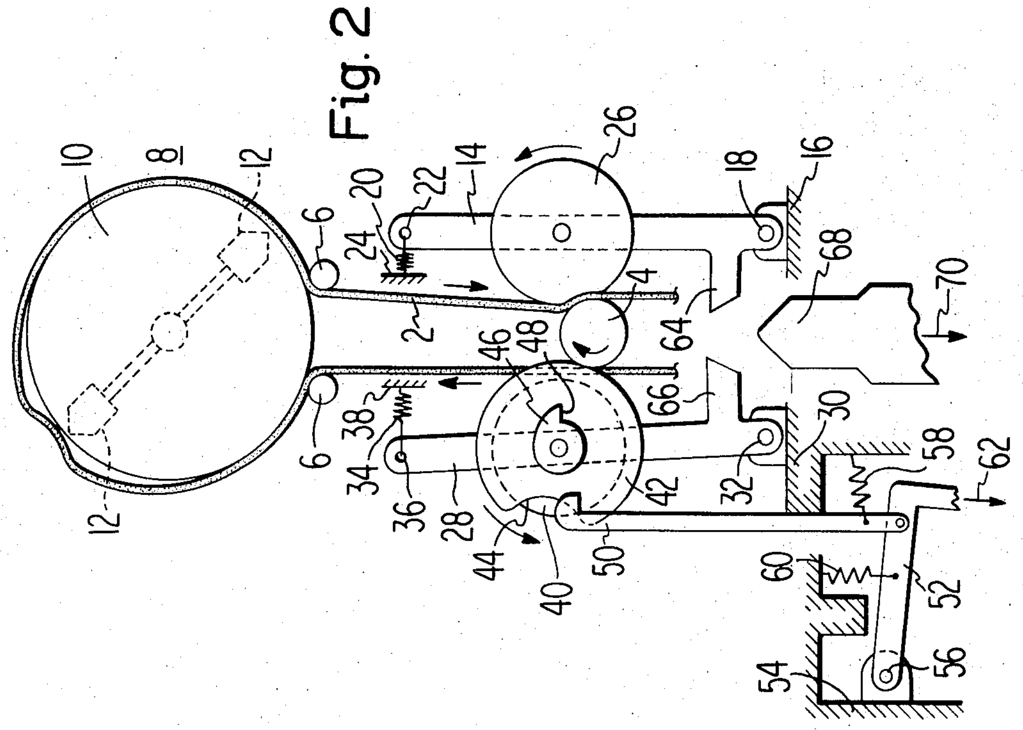
FIGS. 1, 2 and 3 are plan views illustrating sequential operating steps of an embodiment of the invention in a recorder reproducer system.
Figure 4:
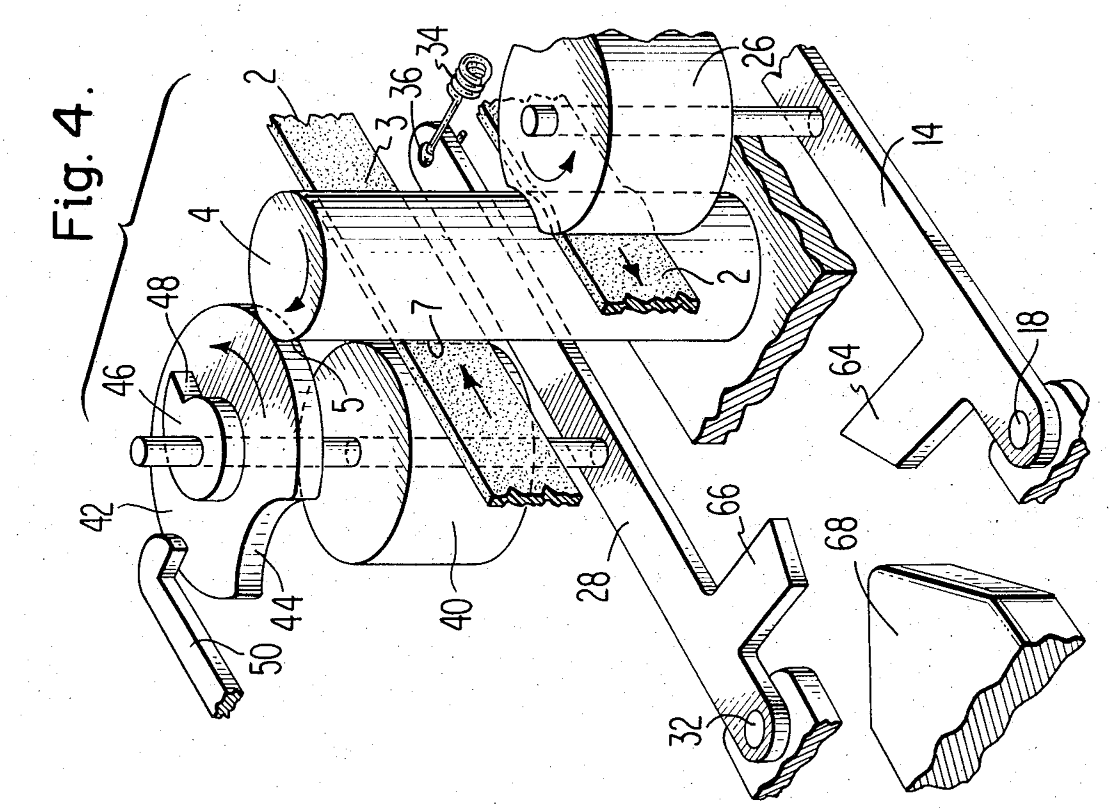
FIG. 4 is a perspective view of a portion of the arrangement of the embodiment of FIGS. 1–3.
Figure 3:
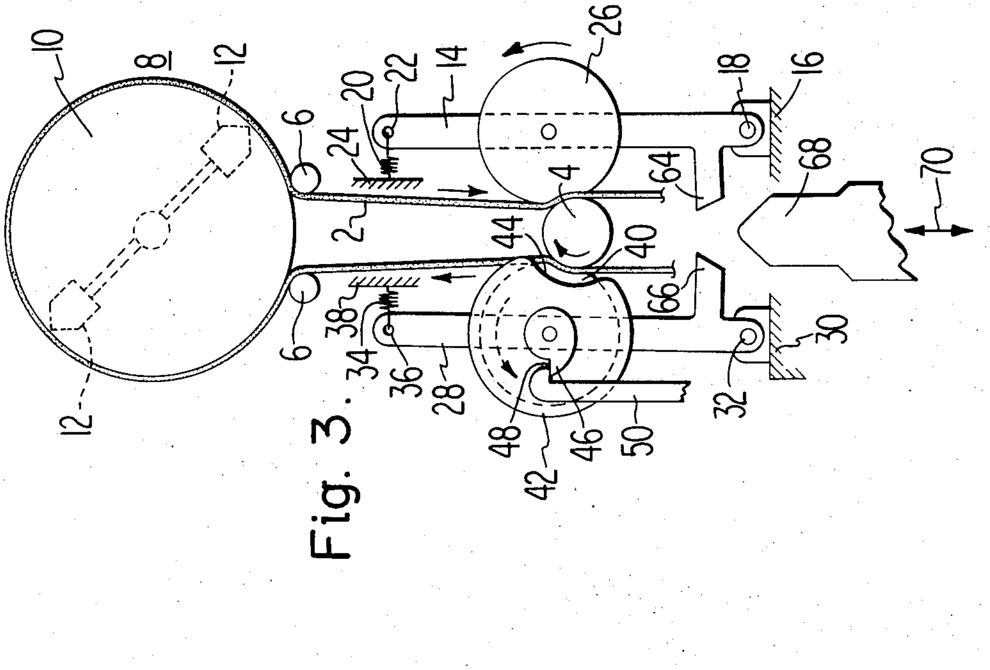

The operation of the invention will now be discussed with regard to FIGS. 1–4 which depict various operating conditions of the embodiment of the invention shown therein. In FIGS. 2–4 like numbered elements are identical to and correspond with those shown and described with regard to FIG. 1. In FIG. 1 the fork or plunger means 68 is interposed between the projection portion 64 and 66 of the arms 14 and 28 respectively. For this condition of the member 68 the arms 14 and 28 are caused to be pivoted or rotated in a direction away from the medium 2. The shape and amount of travel of the member 68 is arranged to cause the pinch roller 26 and 40 and the member 42 to be disposed in spaced relation with the capstan 4. In this condition the medium 2 may more easily be disposed or threaded about the mandrel 10 and along opposite sides of the capstan 4. The medium 2 when disposed or threaded along the transport path may have slack portions, here shown existing about the mandrel 10, which do not conform to the desired path for the medium 2. When it is desired to operate the recorder reproducer system, the member 68 is retracted or removed from contacting relation with projections 64 and 66 of the arms 14 and 28 as shown in FIG. 2. At the same time or preferably before the retracting of the member 68, a force is applied to the member 52 in the direction of arrow 62. This force causes the pawl member 50 to engage and rotate the member 46. The rotation of the member 46 by the motion of the pawl member 50, causes the disc or cam member 42 to be rotated through an angle wherein the larger diameter of the portion of the member 42 is disposed opposite the capstan 4. With the member 68 retracted the spring members 20 and 34 cause the respective arms 14 and 28 to be pivoted or rotated toward the medium 2. As shown in FIG. 2, in this condition pinch roller 26 urges the exiting portion of the medium 2 into motion parting or driven engagement with the capstan 4. At the same time, the pinch roller 40 is prevented from urging the entry portion of the medium 2 into motion part engagement with the capstan 4, by the member 42 which is in contacting relation with the capstan 4. The foregoing arrangement will be more clearly understood by considering FIG. 4. In FIG. 4 the entrance portion 3 of the medium 2 is shown disposed between the capstan 4 and pinch roller 40. The periphery of the disc or cam means 42 for the condition shown in FIG. 2, is disposed in coactive driven engagement with a portion 5 of the capstan 4. The portion of the peripheral surface of the member 42 which contacts the capstan 64 is disposed a greater distance from the axis of rotation than the peripheral surface of the pinch roller 40. Thus, for the interval during which a portion of the peripheral surface of the member 42 is in contacting relation with the capstan 4, the pinch roller 40 is prevented from urging the entrance portion 3 of the medium 2 into motion imparting engagement with a portion 7 of the capstan 4.

Returning to the consideration of FIG. 2, it is noted that during the interval which the member 42 is rotatably driven by the capstan 4, no additional portions of the medium 2 are advanced by pinch roller 40 to the transducer head scanner assembly 10. However during this period, the capstan 4 and pinch roller 26 are effective to withdraw or move the portions of the medium 2 which are disposed about the transducer head scanner assembly 10. This movement of the medium 2 by the capstan 4 and pinch roller 26, in the absence of corresponding movement of the medium 2 by the pinch roller 40 and capstan 4, causes any slack that may have existed in the medium 2 to be removed. This is true since the capstan 4 and roller 26 act to pull the medium 2 against the resistance provided by the path of the medium 2 from the supply means, not shown, to and about the scanner 8.

As shown in FIG. 3, the member 42 will continue to be rotated by the capstan until the cutout or depressed portion 44 is opposite the capstan 4. By this time, as shown in FIG. 3, any slack which may have existed in the medium 2 has been removed. As previously indicated, the dimensions of the portion 44 of the member 42 are made to interrupt the driven relation between the member 42 and the capstan 4, by causing a spaced relation to exist between periphery of the member 42 and the capstan 4. Because of the spaced relation between the portion 44 of the member 42 and the capstan 4, the arm 28 is caused to be further rotated toward the entrance of the medium 2. This in turn enables the pinch roller 40 to urge the medium 2 into motion imparting engagement with the capstan 4. As previously indicated, the member 42 and the pinch roller 40 are mounted for rotation independently of one another. Thus the member 42 remains in the position shown in FIG. 3, while the pinch roller 40 is rotated. Thus the capstan 4, in cooperation with pinch rollers 26 and 40 is effective in advancing the medium 2 in controlled manner without slack to, about and away from the transducer head scanning assembly 10.

Figure 5:
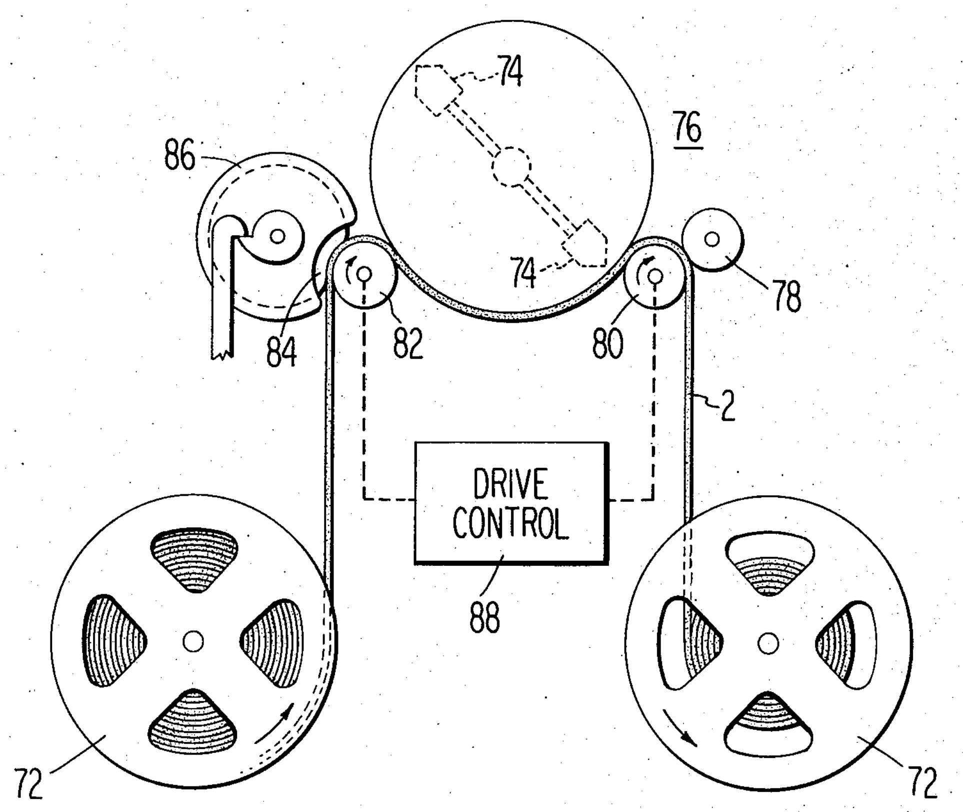
FIG. 5 illustrates a further embodiment of the invention.

Modifications of the embodiment of the invention shown and described may be implemented by those skilled in the art, such as by providing a means for drawing the medium past the transducer which is separate from the means for advancing the medium to the transducer and delaying the enabling of the latter means with respect to the enabling of the former means by any suitable mechanical and/or electrical intercoupling. Such an arrangement is shown by way of example in FIG. 5. In FIG. 5, the web 2 is rewound from and rewound on suitable supply and takeup reels 72. The web 2 is disposed along a path in cooperative relation with the transducing heads 74 of a scanner assembly 76. The web 2 is drawn through the path adjacent the scanner 76 by the pinch roller 78 and capstan 80. The advancing of the web 2 into the path about the scanner 76 is provided by a further driving capstan 82 and the associated pinch roller 84. The position of coactive relation of pinch roller 84 with capstan 82 is controlled by a cam disk arrangement 86, such as shown and described in FIGS. 1–4. The disabling of the driving members 80 and 82 is provided from a common drive control unit 88. The pinch rollers 78 and 84 may be mechanically operated by an arrangement of arms and members as previously described.

Also for example, the basic means utilized for imparting motion to the medium in any of the figures may be a pneumatic type device, rather than a rotatable capstan as shown and described herein.

What is claimed is:

1. In an apparatus for transporting an elongated flexible record medium disposed along a path, including transducing means in cooperative relation with said medium in a given portion of said path, an arrangement for removing slack in said medium in at least said given portion of said path, comprising:

second means when enabled coacting with a section of said medium beyond said given path portion to draw said medium through said given portion of said path;

third means mounted in advance of said given path portion, said third means when enabled cooperating with a further section of said medium to feed said medium to said given portion; and means for delaying the enabling of said third means with respect to said second means for a predetermined interval during which said medium is drawn through said given path portion by said second means.

2. The invention according to claim 1, wherein said second and third means include common drive means for imparting movement in a given direction to spaced sections of said record medium along said path.

3. The combination with an apparatus having means for drawing a continuous flexible recording web along a path past signal transducing means mounted for cooperative relation with said web at a first path portion, comprising:

second means mounted adjacent a further portion of said path preceeding said signal transducing means, said second means being adapted to controllably advance said web toward said transducing means when said web is disposed in cooperative relation therewith;

third means normally operable to urge said web into cooperative relation with said second means; and fourth means coupled to said third means and responsive to said second means to inhibit the operation of said third means for a period determined by the operation of said second means.

4. Apparatus for transporting a continuous flexible recording web along a path in cooperative relation with a signal transducer, comprising:

drive means mounted to coact with said web at portions of said path for imparting movement of said web past said transducer;

second means for urging said web at a first portion of said path into motion imparting relation with said drive means;

third means in a first condition thereof for urging said web at a further portion of said path into motion imparting relation with said drive means, and in a second condition thereof said third means being in non-urging relation with said web; and further means coupled to said third means for disposing said third means in said second condition thereof and responsive to said drive means for causing a transition of said third means from said second condition to said first condition thereof at a time determined by the duration of operation of said drive means.

5. Apparatus for transporting a continuous elongated recording web in cooperative relation with a signal transducer, comprising:

means defining a path for said web, said path including a first portion extending toward said transducer and a second portion extending away from said transducer in spaced relation with said first portion;

rotatable drive means mounted between said first and second path portions for motion imparting engagement with a first side of a web disposed along said first and second path portions;

third means mounted adjacent the other side of a web section disposed in said second path portion for urging said web section into motion imparting engagement with said drive means;

fourth means moveably mounted adjacent the other side of a web section disposed in said first path portion and adapted to urge said web section into motion imparting engagement with said drive means;

fifth means for disposing said fourth means in urging relation with said web section at said first path portion;

sixth means rotatably mounted and having first and second peripheral surface portions, in one rotary condition thereof said first surface portion is in contacting driven relation with said drive means and in a further rotary condition thereof said second surface portion is in non-contacting non-driven relation with said drive means; and means coupling said fifth and sixth means and arranged to disable said fifth means for said one rotary condition of said sixth means and for enabling said fifth means for said further rotary condition of said sixth means.

6. In combination with a recorder reproducer system including transducer head scanning means and a capstan in spaced relation with said scanning means, first and second pinch rollers adjacent said capstan said rollers being moveably mounted for normally urging respective portions of a recording web into contacting relation with said capstan to transport said web to, past and away from said scanning transducer head, the improvement comprising:

rotatable cam means being mounted in driven relation with said capstan, means coupled to one of said pinch rollers and responsive to the rotation of said cam means for influencing the position of said one roller, said cam means including a first portion having a shape when in cooperative relation with said capstan for causing said one roller to be disposed in non-urging relation with said web, and a further shaped portion wherein the position of said one roller is independent of said cam means.

7. The invention according to claim 6, and further including means coupled to said cam means for rotating said cam means through a given angle to cause said first portion to be in driven relation with said capstan.

8. The invention according to claim 6, wherein said first and second pinch rollers and said cam means are rotatably mounted on pivotable means, and means selectively engageable with said pivotable means for disposing said pivotable means in predetermined spaced relation with said capstan.

9. The invention according to claim 6, wherein said web is disposed in a loop about said scanning means with an entrance portion disposed adjacent one side of said capstan, and an exit portion disposed adjacent a further side of said capstan, first and second arms without said loop adjacent said entrance and exit portions respectively, each of said arms being pivotally mounted at an end thereof, means for rotatably mounting said first and second pinch rollers on respective ones of said arms, means coupled to said arms for biasing said arms toward said web, each of said arms further having projections extending toward one another in spaced facing relation, means moveably mounted and adapted to be interposed between said spaced projections, said means when interposed causing said arms to be rotated away from said web, a disc mounted coaxially with the one of said pinch rollers on said arm adjacent said entrance portion for rotation independent of said one pinch roller, said disc having a substantially circular periphery with a depression therein, the radius of said disc being greater than the radius of said one pinch roller with said depression providing a given spacing between said disc and said capstan when said depression is opposite said capstan, said given spacing being not less than the difference between the radius of said one pinch roller and said disc.

* * * * *